Figure 1:
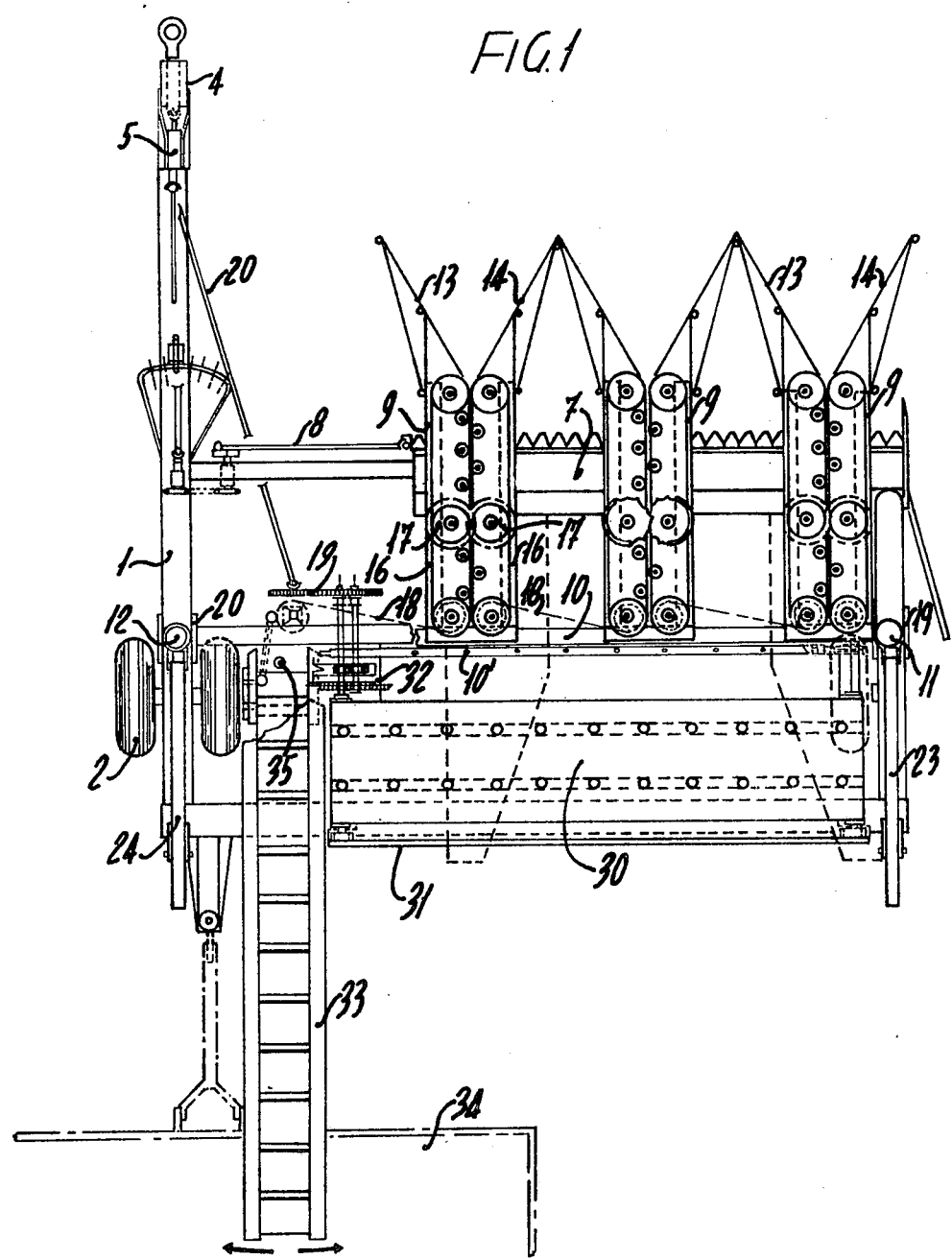

United States Patent [19]
Peruzzo

[11] 3,979,888
[45] Sept. 14, 1976

[54] MACHINE FOR CUTTING AND HARVESTING GRAMINACEOUS PLANTS

[76] Inventor: Adriano Peruzzo, Via Valsugana, 48, Curtarolo (Padova), Italy

[22] Filed: Dec. 26, 1974

[21] Appl. No.: 536,580

[52] U.S. Cl. .............................. 56/13.8; 56/13.9; 56/63; 56/500
[51] Int. Cl.² ..................................... A01D 45/02
[58] Field of Search ............... 56/13.7, 13.8, 13.9, 56/53, 54, 55, 63, 500–505

[56] References Cited
UNITED STATES PATENTS

| | | | |
|---|---|---|---|
| 24,487 | 6/1859 | Philipp | 56/63 X |
| 326,993 | 9/1885 | Kunsman | 56/63 |
| 1,122,741 | 12/1914 | Hadley | 56/63 |
| 1,313,004 | 8/1919 | Melton | 56/63 X |
| 2,526,543 | 10/1950 | Davies | 56/63 X |

*Primary Examiner*—J.N. Eskovitz
*Attorney, Agent, or Firm*—Lane, Aitken, Dunner & Ziems

[57] ABSTRACT

A machine for cutting the tops of plants into predetermined uniform lengths, includes a support structure and moving means for moving the support structure relative to the plants. The machine further includes a first cutter for cutting the plants from the ground at a first length, a second cutter for cutting the plants at an intermediate length, gripper and conveyor for gripping the plants and conveying them from the first cutter to the second cutter so that the plants can be cut at an intermediate length, third cutter for cutting the tops of the plants into the predetermined uniform lengths, and aligner and conveyor for receiving the plants from the gripper and conveyor and aligning the tops thereof and conveying the plants to the third cutter.

12 Claims, 2 Drawing Figures

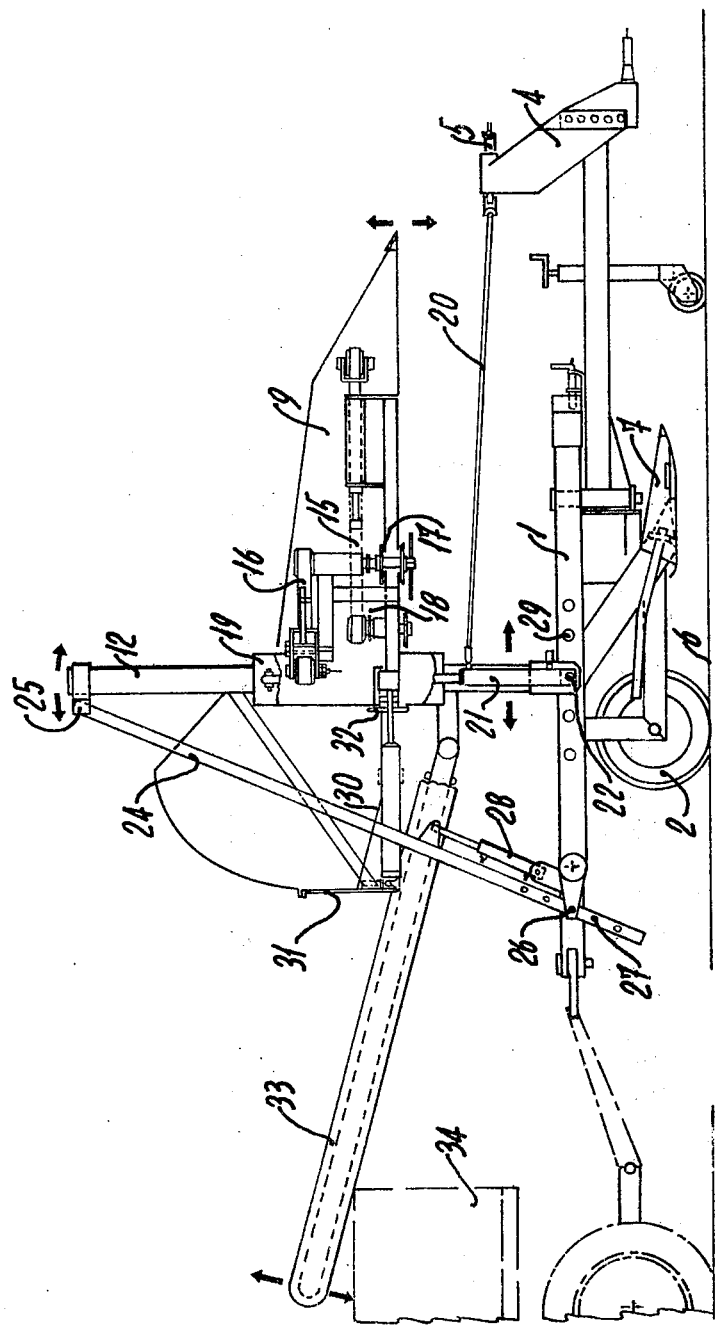

MACHINE FOR CUTTING AND HARVESTING GRAMINACEOUS PLANTS

Generally, this invention relates to a machine for cutting and harvesting graminaceous plants, and more particularly is concerned with broomcorn harvest which, as well known, is provided with a cob type of inflorescence, that is comprising a tuft carrying the plant seeds. In broom production the plant portion for use is just the end portion, which is out to a total length of about 60–70 cm.

Up to now, broomcorn harvest is carried out by firstly cutting at the base of the plan stalks or stems, and then cutting the end portion of the previously sheared stalks or stems. While the first operation can be performed by a standard mowing machine, the second operation is wholly manually accomplished, therefore involving time consuming and high costs.

Therefore, it is an object of the present invention to provide a machine allowing a completely automatic cut to size and harvest for broomcorn.

It is a further object of the present invention to provide a machine of the above set forth character, which machine can be adapted and adjusted for broomcorn cutting according to the plant height and side spacing between the rows of plants.

It is a further object of the present invention to provide a machine of the specified type, wherein by successive cutting operations as carried out on the same machine, the plants can be cut to size that initially the stalk or stem is presented at perfectly taut condition to the cutting operations in order to assure a maximum evenness in cutting.

Generally, a machine according to the invention for cutting and harvesting any graminaceous plants, and particularly broomcorn, comprises a support structure, means for catching and cutting the top portions of the plants, such means being carried by said structure, and a continuous conveyor located rearwardly of said cutting means; means being also provided for aligning the tips of the cut plant portions, as located laterally of the conveyor, and further cutting means at the end of said conveyor.

According to the invention, said first cutting means are arranged according to two superimposed longitudinal cut lines, comprising a first lower cut device, closely spaced apart from the ground for cutting operations at the base of the plant stalk or stem, and an upper cut device for cutting the top or useful upper portion of the plant stalk or stem. The cutting means and conveyor can be directly driven from the power take-off of a tractor, as well as from independent drive devices.

Preferably, the upper cutting device of said first cutting means is carried adjustable in height so as to accommodate the heights of the plant stalks or stems. This adjustment can be accomplished by a vertical movement combined with a possible rotation of the assembly comprising the upper gripper and cutting device. This gripper device associated with said first cutting can comprise, for example, a system of opposite rotary belts, chains or the like, and serves the purpose of initially gripping the plant stalks or stems, so that the same are presented at taut condition to the cutting operations, and subsequently conveying the cut upper portion of the stalk or stem to the rear continuous conveyor.

In case, the cut lower portion of the stalk or stem can be dropped on a conveyor device, or in the case on the ground. The machine can be provided with a device for binding the cut upper portions of the plants, as well as further conveyor for directly discharging the cut plant portion on a pick up cart or wagon at the back.

The machine can be adapted for cutting plants on a single row, but preferably the machine is set for simultaneously cutting a plurality of rows, and in this case said first cutting means include a lower cutting device comprising a standard reciprocating cutting edge or blade and a set of juxtaposed upper cutting units, the latter being laterally adjustable in place according to the spacings between the rows of plants to be cut.

An embodiment of a machine according to the invention will now be described with reference to the figures of the accompanying drawings, in which:

FIG. 1 is a diagrammatic top plan view of a machine according to the invention; and FIG. 2 is a side view, partly cut away, of the machine shown in FIG. 1.

A machine according to the invention is shown in the figures of the accompanying drawings as comprising a frame 1 carried by wheels 2. Forwardly and on one side, said frame 1 carries a tractor coupling unit 4 with a joint 5 for connection to the power take-off of the tractor.

At the level of wheels 2, that is at a short distance from the ground 6, said frame 1 carries a first lower cutting device 7 for cutting the plant stalk or stem at the base or at a short distance from the ground. This cutting device 7 can comprise, for example, a standard reciprocating mowing blade suitably connected through a drive system 8 to the machine joint 5.

At the top of the cutting device 7, the machine frame 1 carries a second cutting device comprising one or more upper cutting units 9 for cutting and harvesting or gathering any graminaceous plants, these units being adjustable both in height and slope and side spacing for accommodating the best plant cutting conditions.

Juxtaposed cutting units are shown in FIG. 1 for simultaneously cutting three rows of plants, but this should to be understood for illustrating and not limiting purposes.

As shown from the figures of the accompanying drawings, each of the upper cutting units substantially comprise a structure which is cantilever carried by a transverse bar 10 which, in turn, is carried at the end by two side vertical uprights 11 and 12, respectively.

The structure 9, defining the upper cutting line, forwardly has two rearwardly convergent, substantially vertical surfaces 13 and 14 for guiding the plants of one row to gripping and drawing members comprising, for example, a pair of endless belts or chains 15 and 16, respectively, carried by the structure 9 of each of the cutting units.

Particularly, there is a first pair of endless belts 15 substantially extending for nearly all the length of unit 9 to catch the plant stalks or stems and present the same at a taut condition to the lower cutting device 7. At the top of the gripping members or endless belts 15, provision is made for second gripping members or endless belts 16 for catching the tops or upper portions of the plants cut away by the second cutting device comprising pairs of rotary blades or knives 17. The gripping members 15 and 16 extend on the opposite sides of the cutting device 17. The catching belts for cut stalk conveyance 15 and 16, as well as said rotary blades or knives 17, can be indirectly or directly driven through suitable chain drives or the like 18 controlled by a gear wheel system 19 operated by articulation 20 and joint 5 for coupling to a power take-off.

As above mentioned, said upper cutting devices are adjustable both in height and width to accommodate the best cutting conditions. To this end, the cutting devices 9 can be caused to slide longitudinally of the support bar 10 and be secured in place at the desired spacing by means of suitable pins inserted in holes 10' in the bar. This adjustment can be manually effected.

The adjustment in height and slope for units 9 is provided as follows. At each of its ends, the support bar 10 is secured to bearings 19 and 20 longitudinally sliding on the associated side upright 11, 12. These bearings 19 and 20 are connected to the rod of an associated double-acting hydraulic or pneumatic cylinder, designated at 21 in FIG. 2, for adjusting the position in height of the whole unit.

A further adjustment of the position for the upper cutting units 9 can be effected by a rotation about a horizontal axis. To this end, the uprights 12 are pivoted at 22 to the machine frame 1 and maintained at upright position by rods 23 and 24, respectively, which, as shown at 25 of FIG. 2, are articulated to the upper end of the associated upright and connected at 26 to the machine frame 1 by a pin which can be inserted in holes 27 formed at the lower ends of rods 23 and 24, respectively. A hydraulic or pneumatic cylinder 28, as articulated to frame 1, is connected by its shaft or stem to rod 23 or 24, respectively, to control the rotation for the whole unit, when the blocking pins 26 have been removed.

A further and last adjustment for the upper cutting devices can be provided by horizontally displacing the axis of rotation for said uprights 11 and 12. To this end, the machine frame 1 is provided with horizontally spaced apart holes 29 (FIG. 2), wherein the upright pivots 22 can be placed, as required.

The machine is completed by a horizontal conveyor 30 arranged transversely of the machine and rearwardly of the gripping and carrying devices for the top of the stalk of cut plants, which is driven by the gear drive 19 shown in FIG. 1.

The tops of the cut plants drop down on the conveyor 30. However, as above mentioned, the plants are generally of a irregular height and, therefore, to obtain a correct cut to size of the useful upper portions of the plants, laterally and longitudinally of the conveyor 30, provision is made for a levelling or aligning device on the tips of the cut plant portions, the device substantially comprising a lateral side or side board 31, against which the cut tops will bear and slide. At the end of conveyor 30, a further cutting device 32 is located and provides for cutting all the stalks at a same length. Then, the cut and trimmed plant tops can be caused to drop down on a conveyor providing to lay the same on the ground as perfectly aligned and rotated through 90°, or can be caused to drop down on a conveyor 33 for unloading into the body 34 of a cart or wagon towed at the back of the machine and coupled to the machine, as partially diagrammatically shown in the figures of the accompanying drawings.

The operation of the machine is substantially as follows. The machine is towed by a tractor (not shown) along the rows of plants to be cut, which are conveyed by the sloping walls 13 and 14 of each of the upper cutting devices 9 to the gripping members comprising the lower belts 15 of a larger length. The plant stalks are then gripped and moved backwards so as to be presented at a taut condition to the effect of the lower cutting device 7, the latter shearing the plant stalks at a short distance from the ground 6. The cut plants are then carried or moved rearwardly of the lower gripping members 15 and, at the upper cutting devices 17, the stalks are cut at a predetermined height, dropping the underlying portion on the ground or on a chute conveyor, not shown. At the same time, the plant top is further rearwardly moved by the upper gripping members 16 carrying to and dropping the cut portions on the rear conveyor 30. Then, the cut plant portions will drop down on conveyor 30, thereby being moved transversely of the machine, and when moving the tips thereof will adhere and be levelled or made even against said lateral side or side board 31.

As above mentioned, this levelling for the tips of plant cut portions is required because of the different height normally presented by the plants along a same row. Therefore, the cut and tip levelled plant portions are fed from conveyor 30 to a third cutting device 32 providing for cutting the stalks to size, which are then all of a same length. The plant tops, now perfectly cut to size, can be dropped down on conveyor 33 and unloaded thereby into said body 34, which follows and is suitably towed by the machine, or by a rotation of conveyor 33 through 90°, laterally about an axis of rotation 35, the cut plant portions can be laterally unloaded in a perfect alignment relationship as ranks. If desired, instead of conveyor 33, the machine could be provided with a conventional suitable binding device, providing on the machine for directly binding the plant portions cut to size.

As required, prior to cutting or during cutting, the position of the upper cutting devices can be adjusted by a vertical displacement thereof along uprights 12, or horizontal movement by displacing the position of pivot 22, or by varying the sloping thereof to anticipate or retard the stalk gripping by the gripping members 15, and to accommodate the best cutting conditions. As above mentioned, the machine can be operated by connection to the power take-offs of a tractor, but, if desired, the machine could be provided with a suitable quite independent drive device.

What I claim is:

1. A machine for cutting the tops of plants into predetermined uniform lengths, comprising, a support structure, moving means for moving the support structure relative to the plants, first cutting means for cutting the plants from the ground at a first length, second cutting means for cutting the plants at an intermediate length, gripping and conveying means for gripping the plants and conveying them from the first cutting means to the second cutting means so that the plants can be cut at an intermediate length, third cutting means for cutting the tops of the plants into the predetermined uniform lengths, aligning and conveying means for receiving the plants from the gripping and conveying means and aligning the tops thereof and conveying the plants to the third cutting means.

2. The machine in claim 1, wherein the first cutting means includes a stationary reciprocating mower blade.

3. The machine in claim 1, wherein the second cutting means and the gripping and conveying means are comprised of a plurality of cutting units.

4. The machine in claim 3, wherein each cutting unit includes a pair of endless belts positioned adjacent to each other along the length thereof and adapted to receive and grip plants therebetween, the second cutting means being located below said belts and adapted to cut the plants as they are conveyed by the gripping and cutting means.

5. The machine in claim 4, wherein each cutting unit includes a second pair of endless belts positioned adjacent to each other along the length thereof and adapted to receive and grip plants therebetween, the second pair of belts being located above the first paair of belts and downstream from the second cutting means, the second pair of belts being adapted to move at a greater speed than the first pair of belts.

6. The machine in claim 3, wherein the cutting units include first adjustment means for adjusting the position of the cutting units vertically relative to the support structure, second adjustment means for adjusting the position of the cutting units horizontally in the plane of movement of the support structure, third adjustment means for adjusting the position of the cutting units at an incline in the plane of movement of the support structure.

7. The machine in claim 5, wherein the second cutting means includes a rotary blade located between the belts in the first pair.

8. The machine in claim 3, wherein the cutting units are spaced laterally relative to the direction of movement of the support structure and are mounted on a horizontally disposed cantilevered bar.

9. The machine in claim 6, wherein the first adjustment means includes a pair of vertical supports and bearing surfaces movably mounted on said supports, and fluid activated cylinder means for moving said bearing surfaces by utilizing fluid under pressure.

10. The machine in claim 6, wherein the second adjustment means includes a horizontal support means with a plurality of horizontally disposed holes therein for supporting the cutting units, a vertical support means for supporting the cutting units adapted to move along the horizontal support means, pin means for fixing the vertical support means relative to the horizontal support means at a selected one of said holes.

11. The machine in claim 6, wherein the third adjustment means includes pivot means for pivotally connecting the cutting units to the support structure, a support bar pivotally connected to the cutting units and movable relative to the support structure, and fluid activated cylinder means mounted on the support structure and connected to the support bar for pivotally moving the cutting units relative to the support structure.

12. The machine in claim 1, wherein the aligning and conveying means includes a conveyor disposed horizontally and adapted to convey the plants in a direction perpendicular to the direction the plants are conveyed by the gripping and cutting means, the aligning and conveying means including a back wall for aligning the tops of the plants.

* * * * *